May 24, 1949.  P. S. VILES  2,471,131
CATALYTIC CONVERSION OF HYDROCARBON OIL
Filed June 22, 1946
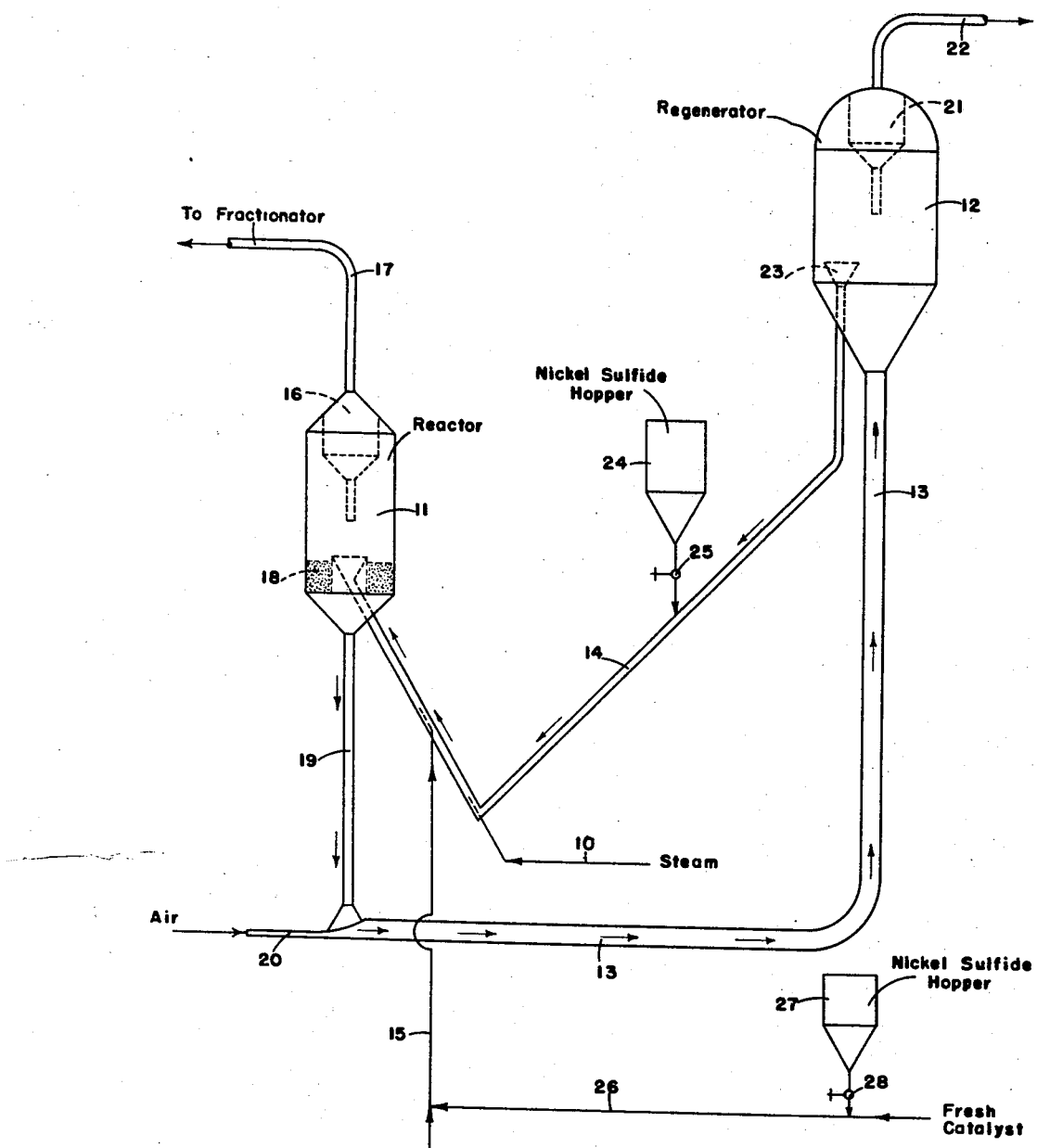

Patented May 24, 1949

2,471,131

UNITED STATES PATENT OFFICE 2,471,131

CATALYTIC CONVERSION OF HYDROCARBON OIL

Prentiss S. Viles, Goose Creek, Tex., assignor, by mesne assignments, to Standard Oil Development Company, Elizabeth, N. J., a corporation of Delaware Application June 22, 1946, Serial No. 678,542

1 Claim. (Cl. 196—52)

This invention relates to improvements in the art of hydrocarbon oil conversion and more particularly to the conversion of hydrocarbons by the fluid catalytic cracking technique using natural and/or synthetic powdered catalysts.

There are two types of fluid catalytic cracking operations, the so-called downflow type and the upflow type. In the downflow type of fluid flow catalytic cracking, there is provided a reactor and a regenerator. Finely divided catalyst, in suspension in vapors of the hydrocarbons to be cracked, is fed into the bottom of the reactor. The velocity of flow of the hydrocarbons is regulated so that hydrocarbon vapors carry the catalyst to an intermediate point in the reactor at which point there is a concentration of catalyst resulting in the forming of a dense zone from the outer annulus of which the catalyst particles drop to the bottom of the reactor from which they are withdrawn. Upon leaving the reactor the catalyst particles are picked up by a stream of hot air which carries them to the regenerator where the carbonaceous materials deposited on the catalyst in the reactor are consumed by combustion. The catalyst flow in the regenerator follows the same pattern as in the reactor with regenerated catalyst falling into a well in the lower section of the regenerator from which point it is fed back to the reactor. A detailed description of the downflow type of fluid flow catalytic cracking process is given in a patent application by Conrad H. Kollenberg under U. S. Serial No. 547,553, filed August 1, 1944 now Patent No. 2,407,374.

In the upflow type of fluid flow catalytic cracking, a reactor and a regenerator are also employed. Finely divided catalyst, in suspension in vapors of the hydrocarbons to be cracked, is fed into the bottom of the reactor. The catalyst and the hydrocarbon vapors leave the reactor in a common stream and are separated in equipment provided for this purpose. The catalyst is then fed into the regenerator where the carbonaceous materials deposited on the catalyst in the reactor are burned off in the presence of controlled amounts of air. The catalyst from the regenerator is separated from the gaseous products of combustion and is then fed back to the reactor.

It is known that the alumina-silica fluidized catalysts become contaminated after a period of usage in the fluid catalytic cracking process. These contaminants are believed to be metals and metallic oxides and probably are the result of erosion of the metallic equipment. The principal metal contaminants are believed to be iron, nickel and chromium and their oxides. The presence of these contaminants in the catalyst causes an undesirable effect on the conversion of the heavier hydrocarbons to lighter hydrocarbons. Instead of useful hydrocarbons being formed, a substantial quantity of the feed hydrocarbons is converted to fixed gases and useless carbonaceous bodies. The activity of the catalyst is also reduced appreciably by these contaminants and as a reult, a substantial quantity of the catalyst must be discarded, either continuously or periodically, and replaced with fresh catalyst in order to maintain a satisfactory catalyst activity for optimum operation of the fluid catalytic process. This procedure is both expensive and wasteful.

It is, therefore, a principal object of my invention to overcome the undesirable effect of these contaminants by including with the circulating catalyst mass an additive which will mitigate the effect of the contaminants to such an extent as to allow the effective life span of the catalyst in the process to be increased.

A further object of my invention is to provide an additive that is adaptable to the fluid catalytic technique, i. e., one that can be fluidized, and in addition an additive that will at least partially withstand the oxidizing conditons of the regeneration step of the fluid catalytic cracking process so that it will retain its activating effect for more than one cycle through the process.

A still further object of my invention is to provide a hydrocarbon conversion catalyst of a new composition which is more selective and more active than the conventional alumina-silica type catalysts so that satisfactory conversion may be attained by milder cracking conditions, i. e., lower temperatures, etc. In other words, the new catalyst will increase the flexibility of the fluid type of cracking operations by furnishing a control over the type of products obtained through a combination of increasing or decreasing the quantity of additive injected and changing the cracking conditions.

In accordance with the present invention, the detrimental effects of the afore-mentioned types of metals and metal oxide contaminants and fluid catalysts are substantially eliminated by admixing with the circulating catalyst an amount of nickel sulfide not in excess of 0.5 weight per cent of the circulating catalyst. The nickel sulfide may be injected as a slurry or suspension in a fluid with the hydrocarbons or with the fresh catalyst or it may be injected into the regenerated catalyst circulated in the process.

It has been discovered that the addition of 0.5 weight per cent or lesser quantities of nickel sulfide to a representative used regenerated alumina silica type catalyst will increase its activity appreciably. There are presented in the following table data obtained in a number of runs on which a gas oil was reacted in the presence of a cracking catalyst to which varying amounts of nickel sulfide had been added. The increased activity of the regenerated catalyst containing 0.5% and 0.1% by weight of nickel sulfide is compared with the activity of the same catalyst without the added nickel sulfide. These data show that the critical range of 0.5% by weight and less of nickel sulfide increased the activity of the plant regenerated catalyst and improved the product distribution appreciably whereas a nickel sulfide content in the order of 5% by weight caused the catalyst to become overactive and the product distribution to be deteriorated. The data obtained with the catalysts which contained 0.5% nickel sulfide show that they have been activated to the extent that the severity of the cracking conditions may be reduced somewhat and still obtain satisfactory catalyst activity. The specific gravity of the gases obtained during the tests of the catalysts containing 5 per cent nickel sulfide is in the same order of that obtained during conventional dehydrogenation operations.

nickel sulfide must be maintained below .5% by weight; otherwise, the conversion is decreased substantially while gas and carbon producing factors are increased proportionately.

The expression "$D+L$ at 400° F." appearing as one of the activity test results is a measure of catalytic activity. The method of expressing catalyst activity ($D+L$ at 400° F.) indicates the percentage of product distilled at 400° F. plus the distillation loss of the naphtha which is obtained when testing the product obtained by passing a standard feed stock through the catalyst under standard conditions of temperature and pressure. This method of expressing catalyst activity has been widely adopted in the cracking industry.

The gas and carbon producing factors are determined by measuring the gas and carbon produced by passing a standard feed stock through the catalyst under standard conditions of temperature and pressure and comparing the amount of gas and carbon produced with the amount obtained when passing the same feed stock over a steam deactivated catalyst which will give the same gas oil conversion as does the catalyst in question.

The entry "conversion" in the table is essentially the $D+L$ at 400° F. plus the dry gas plus the carbon produced and may be expressed mathematically in the following formula:

$$\frac{100-\text{per cent ignition loss in charged catalyst}}{100-\text{per cent ignition loss in separated catalyst}} \times \frac{\text{weight of charged catalyst}}{100} \times$$

(per cent carbon on spent catalyst − per cent carbon on charged catalyst)

It will be evident that the gas and carbon-producing factors are substantially reduced when adding nickel sulfide in accordance with the present invention while it is also evident that these factors are increased when the nickel sulfide in the catalyst is in excess of 0.5%. It will be further evident that the relative catalyst activity and the conversion is increased when nickel sulfide in the critical range is present whereas when

Table

| | (1) | (2) | (3) | (4) | (5) |
|---|---|---|---|---|---|
| Description of catalyst | Plant Regenerated | (1)+0.1% NiS | (1)+0.5% NiS | (1)+5% NiS | (1)+5% NiS |
| Feed Charge Rate, V./V./Hr | 0.60 | 0.60 | 0.61 | 0.60 | 0.60 |
| Reactor Temperature, °F | 851 | 858 | 856 | 858 | 863 |
| Yield Data: | | | | | |
|   Gas, CF at 60° F | 0.422 | 0.485 | 0.473 | 0.771 | 0.857 |
|   Sp. Gr. of Gas | 0.84 | 0.93 | 0.98 | 0.50 | 0.44 |
|   $D+L$ at 400° F | 27.2 | 31.1 | 28.0 | 18.8 | 15.6 |
|   Vol. Per Cent Cycle Oil | 72.8 | 68.9 | 72.0 | 81.2 | 84.4 |
|   API Gr. of Cycle Oil | 33.1 | 32.4 | 33.0 | 33.2 | 33.6 |
| Catalyst Analysis, Wt. Per Cent: | | | | | |
|   Carbon on charge catalyst | 0 | 0 | 0 | 0 | 0 |
|   Ignition loss on charge catalyst | 0.4 | 0.3 | 1.1 | 4.5 | 4.5 |
|   Carbon on used catalyst | 2.6 | 3.06 | 2.5 | 6.7 | 8.0 |
|   Ignition Loss on used catalyst | 3.9 | 4.2 | 6.6 | 8.7 | 11.1 |
| Calculated Yield Rate, Wt. Per Cent Output Basis:[1] | | | | | |
|   Liquid product | 91.7 | 90.0 | 90.1 | 87.7 | 87.3 |
|   Gas Product | 6.3 | 7.6 | 8.0 | 7.1 | 6.5 |
|   Carbon[2] | 2.0 | 2.4 | 1.9 | 5.2 | 6.2 |
| Conversion, Vol. Per Cent Output Basis | 30.9 | 35.2 | 32.7 | 26.2 | 25.3 |
| Gas, CF/Bbl. Gas oil Disappearance[1] | 957 | 920 | 983 | 2140 | 2300 |
| Gas Producing Factor | 1.92 | 1.77 | 1.93 | 4.40 | 4.75 |
| Carbon Producing Factor | 1.64 | 1.48 | 1.41 | 5.86 | 7.46 |
| Relative Catalyst Activity | 0.22 | 0.28 | 0.244 | 0.17 | 0.165 |

[1] Based on total recovery of gas, liquid, and carbon.
[2] Calculated on the carbon contents of the charge catalyst and spent catalyst and on a constant quantity of ignited catalyst.

It will be noted from the foregoing data that the catalyst to which 0.1 and 0.5% by weight of nickel sulfide and catalyst to which 5% by weight nickel sulfide had been added gave appreciable higher conversions than the catalyst without of nickel sulfide had been added. It will also be apparent from these data that the amount of it is in excess of the critical range, the conversion is decreased and the catalyst activity is similarly decreased.

The invention will be further illustrated by reference to the drawing in which the single figure is a flow diagram of one embodiment thereof.

Referring now to the drawing, numeral 11 designates a reactor and numeral 12 designates a regenerator zone of a fluid catalyst cracking operation. The reactor and the regenerator are fluidly connected by line 13 transferring spent catalyst from the reactor to the regenerator and by line 14 transferring regenerated catalyst from the regenerator to the reactor. In the operation of this embodiment, hydrocarbon in the gas oil boiling range is introduced into the system by way of line 15 which connects onto line 14 and by way of which the hydrocarbon is introduced into the reactor. The oil introduced into the system through line 15 and line 14 mingles in line 14 with the hot regenerated catalyst at a temperature between 850° and 1100° F. and it is then introduced into reactor 11 which is of sufficient capacity to provide ample residence time for catalytic conversion. The oil vapors and catalyst particles are suspended and agitated in the reactor vessel and the reacted products leave the regenerator vessel through a separation means which is shown in the drawing by dotted lines and is indicated by the numeral 16. This separation means may conveniently be a cyclone separator and removes finely divided catalyst particles from the product. The product substantially free of catalyst particles leaves the vessel 11 by way of line 17 which discharges it into a fractionator zone, not shown. The catalyst particles in the reactor 11 drop downwardly through a stripping section designated by numeral 18 in which hydrocarbons are removed from the catalyst particles by stripping with an inert gas or with steam introduced by means not shown. The stripped catalyst particles flow downwardly from reactor vessel 11 into line 19 which connects into line 13. The catalyst particles in line 19 are carried into line 13 by a blast of air introduced by line 20. The blast of air moves the catalyst particles from the vessel 11 to the vessel 12 and also supplies oxygen needed for combustion of the carbonaceous material fouling the catalyst. Air and spent catalyst mixture flow upwardly into the regenerator vessel 12 which is similar to reactor vessel 11 and is of sufficient capacity to provide residence time necessary for combustion of the carbonaceous material deposited on the catalyst in reactor 11.

Regenerator 12 is also provided with a separating means 21 which is shown by dotted lines and which may conveniently be a cyclone separator. The combustion gases are separated from the catalyst in the separating means 21 and leave the regenerator 12 by way of line 22 for routing to other separating means, not shown, to remove finely divided catalyst which may escape separating means 21. Conveniently, the combustion gases in line 22 may be routed to a Cottrell precipitator.

The regenerated catalyst in regenerator 12 drops into a funnel shaped member 23 which conducts the catalyst to line 14 and thence to reactor 11, steam or other vaporous or gaseous material being injected by line 10 to move the catalyst from the regenerator 12 to the reactor 11. Connected to line 14 is a hopper 24 containing nickel sulfide. Flow of nickel sulfide into the line 14 is controlled by a valve 25 which allows between 0.1 and 0.5 weight per cent of nickel sulfide based on the circulating catalyst to be injected into the catalyst flowing through line 14. The injection of this amount of nickel sulfide suppresses the deleterious effect of the contaminants, such as iron, nickel, chromium or their metallic oxides, picked up by erosion in the process as catalyst circulates in the system.

As mentioned before, there may be lost from the system an amount of catalyst through line 22. This may be made up by injecting fresh catalyst through line 26.

As an alternative to the injection of nickel sulfide into line 14 from hopper 24, the nickel sulfide may be injected with the fresh catalyst introduced into the system through line 26. When it is desired to employ this alternative operation, nickel sulfide is introduced in proper amounts from hopper 27 which is controlled by valve 28.

The nickel sulfide injected into the circulating catalyst is somewhat heavier than the catalyst employed, having a relative density of 4.6 against 2.5 for the catalyst. This is not detrimental since it has been found that heavier materials mixed with lighter materials can easily be fluidized in accordance with the technique described.

While the present invention has been described with respect to injection of the catalyst into the circulating stream from the hopper, the catalyst may be injected by mixing with the fresh make-up catalyst in the make-up catalyst hopper, not shown.

The nature and objects of the present invention having been fully described and illustrated, what I desire to claim as new and useful and to be secured by Letters Patent is:

A method for catalytically converting hydrocarbons in a process involving a reactor and a regenerator zone in which a hydrocarbon is contacted with a finely divided suspension of a cracking catalyst contaminated with metals promoting the formation of carbon and fixed gases at a conversion temperature, which comprises separating products of the reaction from the catalyst, regenerating said catalyst by combustion in the presence of an oxygen-containing gas, recovering regenerated catalyst and introducing into the reactor zone said regenerated catalyst with a hydrocarbon oil and an inhibiting amount of nickel sulfide between 0.1 and 0.5 per cent by weight of the catalyst and sufficient to suppress the formation of carbon and fixed gases.

PRENTISS S. VILES.

REFERENCES CITED

The following references are of record in the file of this patent:

FOREIGN PATENTS

| Number | Country | Date |
| --- | --- | --- |
| 2,078,951 | Houdry | May 4, 1937 |
| 2,129,693 | Houdry | Sept. 13, 1938 |
| 2,407,918 | Burgin | Sept. 17, 1946 |